US011660669B2

(12) United States Patent
Tsunoya

(10) Patent No.: US 11,660,669 B2
(45) Date of Patent: May 30, 2023

(54) THREE-DIMENSIONAL SHAPED ARTICLE PRODUCTION METHOD

(71) Applicant: SEIKO EPSON CORPORATION, Tokyo (JP)

(72) Inventor: Akihiko Tsunoya, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 318 days.

(21) Appl. No.: 16/792,995

(22) Filed: Feb. 18, 2020

(65) Prior Publication Data

US 2020/0261973 A1    Aug. 20, 2020

(30) Foreign Application Priority Data

Feb. 20, 2019    (JP) .............................. JP2019-028638

(51) Int. Cl.
*B33Y 10/00*   (2015.01)
*B33Y 70/10*   (2020.01)
(Continued)

(52) U.S. Cl.
CPC .............. *B33Y 10/00* (2014.12); *B22F 1/052* (2022.01); *B22F 3/10* (2013.01); *B22F 10/00* (2021.01);
(Continued)

(58) Field of Classification Search
CPC .. B22F 10/10; B22F 3/10; B22F 10/00; B22F 2003/1042; B22F 1/052; B22F 3/1021; B22F 10/34; B22F 12/55; B22F 12/63; B22F 2999/00; B33Y 10/00; B33Y 70/10; B33Y 70/00; C22C 1/0416; C22C 1/0425;
(Continued)

(56) References Cited

U.S. PATENT DOCUMENTS

2017/0361637 A1    12/2017  Taniuchi
2020/0086559 A1*   3/2020   Sugiyama ............. C04B 35/185

FOREIGN PATENT DOCUMENTS

JP          08-192468 A    7/1996
JP        2016-172434 A    9/2016
JP        2018204105 A  * 12/2018   ............ B22F 1/0014

* cited by examiner

*Primary Examiner* — Anthony M Liang
*Assistant Examiner* — Danny N Kang
(74) *Attorney, Agent, or Firm* — Global IP Counselors, LLP

(57) ABSTRACT

A three-dimensional shaped article production method is a three-dimensional shaped article production method for producing a three-dimensional shaped article by stacking layers and includes a first metal powder supply step of supplying a first metal powder having a first average particle diameter to a shaping table, a layer formation step of forming the layer by compressing the first metal powder supplied to the shaping table, a first liquid supply step of supplying a first liquid containing a second metal powder having a second average particle diameter and a binder to a portion of a constituent region of the three-dimensional shaped article, a second liquid supply step of supplying a second liquid containing at least either the second meal powder at a lower concentration than the first liquid or a third metal powder having a larger average particle diameter than the second average particle diameter and containing a binder to at least a portion of a surface layer region, and a sintering step of sintering a metal in the constituent region by heating a stacked body.

5 Claims, 3 Drawing Sheets

(51) Int. Cl.
- *B22F 10/14* (2021.01)
- *B22F 12/55* (2021.01)
- *B22F 3/10* (2006.01)
- *B22F 10/00* (2021.01)
- *B22F 1/052* (2022.01)
- *B22F 12/10* (2021.01)
- *B22F 12/00* (2021.01)
- *B22F 12/63* (2021.01)
- *B22F 10/34* (2021.01)

(52) U.S. Cl.
CPC .............. *B22F 10/14* (2021.01); *B22F 12/55* (2021.01); *B33Y 70/10* (2020.01); *B22F 10/34* (2021.01); *B22F 12/10* (2021.01); *B22F 12/224* (2021.01); *B22F 12/63* (2021.01); *B22F 2003/1042* (2013.01)

(58) Field of Classification Search
CPC ..... C22C 1/0433; C22C 1/0458; C22C 33/02; Y02P 10/25
See application file for complete search history.

THREE-DIMENSIONAL SHAPED ARTICLE PRODUCTION METHOD

The present application is based on, and claims priority from JP Application Serial Number 2019-028638, filed on Feb. 20, 2019, the disclosure of which is hereby incorporated by reference herein in its entirety.

BACKGROUND

1. Technical Field

The present disclosure relates to a three-dimensional shaped article production method.

2. Related Art

Heretofore, there have been various types of three-dimensional shaped article production methods. Among these, there is a three-dimensional shaped article production method for producing a three-dimensional shaped article by stacking layers. For example, JP-A-8-192468 (Patent Document 1) discloses a three-dimensional shaped article production method for producing a three-dimensional shaped article by repeating formation of a layer with a metal powder of large particles, spray of a metal powder of small particles, and supply of a liquid containing a binder to a constituent region of the three-dimensional shaped article.

When a three-dimensional shaped article is produced using only a metal powder of large particles, voids among the particles of the metal powder become large, so that the density becomes low and the rigidity or the like is lowered in some cases. On the other hand, in the formation of a layer using a metal powder containing only a metal powder of small particles or a metal powder containing both a metal powder of large particles and a metal powder of small particles, aggregation may occur to form a block of the metal powder, and on the contrary, the packing density of the powder becomes small, and the powder cannot be spread thin and uniformly. Therefore, in order to produce a three-dimensional shaped article having a high density, it is conceivable to form a layer using a metal powder of large particles, and spray a metal powder of small particles as in the three-dimensional shaped article production method of Patent Document 1. However, in the three-dimensional shaped article production method of Patent Document 1, even if a metal powder of small particles is sprayed, the metal powder of small particles does not effectively penetrate into voids among the particles of a metal powder of large particles, and a three-dimensional shaped article having a high density cannot be produced in some cases.

Further, when a metal-made three-dimensional shaped article having a high density is produced, it becomes difficult to produce a large three-dimensional shaped article because a vaporized binder or the like cannot escape from the surface layer of the three-dimensional shaped article having a high density when sintering the stacked body.

SUMMARY

A three-dimensional shaped article production method according to the present disclosure is a three-dimensional shaped article production method for producing a three-dimensional shaped article by stacking layers, and includes a first metal powder supply step of supplying a first metal powder having a first average particle diameter to a shaping table, a layer formation step of forming the layer by compressing the first metal powder supplied to the shaping table, a first liquid supply step of supplying a first liquid containing a binder and a second metal powder having a second average particle diameter that is an average particle diameter $1/10$ or more and $1/2$ or less the first average particle diameter to a portion of a constituent region of the three-dimensional shaped article in the layer, a second liquid supply step of supplying a second liquid containing at least either the second metal powder at a lower concentration than the first liquid or a third metal powder having a larger average particle diameter than the second average particle diameter and containing a binder to at least a portion of a surface layer region in the constituent region, and a sintering step of sintering a metal in the constituent region by heating a stacked body of the layers.

DESCRIPTION OF EXEMPLARY EMBODIMENTS

Figure 1:
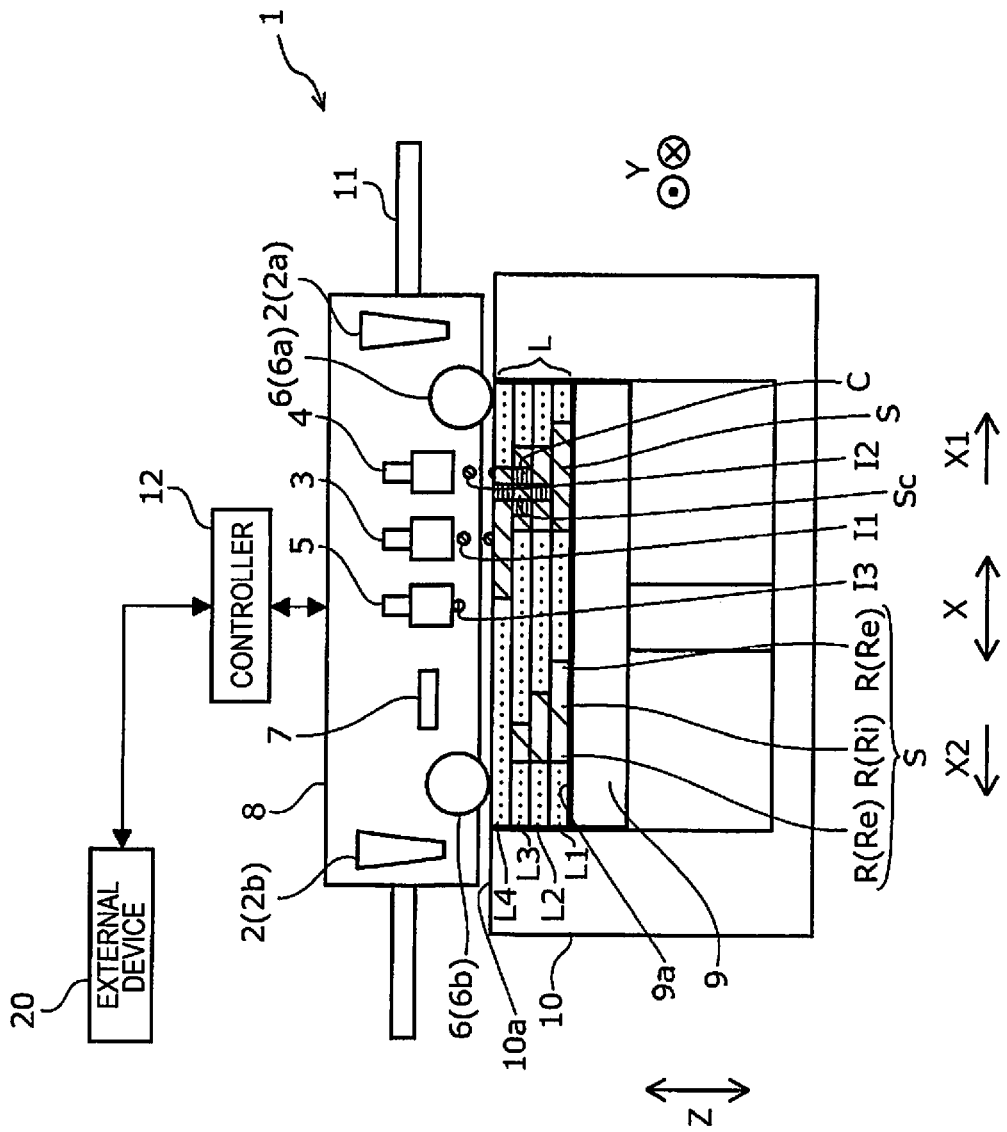
FIG. 1 is a schematic configuration view showing a configuration of a three-dimensional shaped article production apparatus according to one embodiment capable of carrying out a three-dimensional shaped article production method according to the present disclosure.

First, the present disclosure will be schematically described.

A three-dimensional shaped article production method according to a first aspect of the present disclosure for solving the above problem is a three-dimensional shaped article production method for producing a three-dimensional shaped article by stacking layers, and includes a first metal powder supply step of supplying a first metal powder having a first average particle diameter to a shaping table, a layer formation step of forming the layer by compressing the first metal powder supplied to the shaping table, a first liquid supply step of supplying a first liquid containing a binder and a second metal powder having a second average particle diameter that is an average particle diameter $1/10$ or more and $1/2$ or less the first average particle diameter to a portion of a constituent region of the three-dimensional shaped article in the layer, a second liquid supply step of supplying a second liquid containing at least either the second metal powder at a lower concentration than the first liquid or a third metal powder having a larger average particle diameter than the second average particle diameter and containing a binder to at least a portion of a surface layer region in the constituent region, and a sintering step of sintering a metal in the constituent region by heating a stacked body of the layers.

According to this aspect, a first liquid containing a binder and a second metal powder having a second average particle diameter smaller than a first average particle diameter is supplied. That is, by the first liquid that is a liquid easy to penetrate into voids among particles, the second metal powder that is small particles can be effectively disposed in the voids in the first metal powder that is large particles. Therefore, the three-dimensional shaped article can be made highly dense. Further, by disposing a second liquid containing at least either the second metal powder at a lower concentration than the first liquid or a third metal powder having a larger average particle diameter than the second average particle diameter in at least a portion of a surface layer region, in the sintering step of sintering a metal, voids through which the binder or the like escapes can be formed in at least a portion of the surface layer region, so that the binder or the like can be effectively removed (degreased) from the surface layer region. Accordingly, a metal-made three-dimensional shaped article that is large and has a high density can be produced.

In the three-dimensional shaped article production method according to a second aspect of the present disclosure, in the first aspect, in the second liquid supply step, the second liquid may be supplied to the entire surface layer region.

According to this aspect, the second liquid is supplied to the entire surface layer region, and therefore, while making the three-dimensional shaped article highly dense, voids through which the binder or the like escapes from the entire surface layer of the three-dimensional shaped article can be formed, and thus, the binder or the like can be effectively removed (degreased) from the surface layer region.

In the three-dimensional shaped article production method according to a third aspect of the present disclosure, in the first or second aspect, the first liquid and the second liquid may be supplied to an internal region other than the surface layer region in the constituent region.

According to this aspect, the first liquid and the second liquid are supplied to the internal region, and therefore, the binder or the like can be effectively removed (degreased) from the internal region to the surface layer region. Accordingly, a metal-made three-dimensional shaped article that is large and has a high density can be favorably produced.

In the three-dimensional shaped article production method according to a fourth aspect of the present disclosure, in the third aspect, the first liquid and the second liquid may be alternately supplied to the internal region at every layer.

According to this aspect, the first liquid and the second liquid are alternately supplied to the internal region at every layer, and therefore, the binder or the like can be effectively removed (degreased) from the internal region to the surface layer region. Accordingly, a metal-made three-dimensional shaped article that is particularly large and has a high density can be favorably produced.

In the three-dimensional shaped article production method according to a fifth aspect of the present disclosure, in the first or second aspect, the first liquid may be supplied to an internal region other than the surface layer region in the constituent region without supplying the second liquid.

According to this aspect, the first liquid is supplied to the internal region without supplying the second liquid, and therefore, the internal region can be configured to have a particularly high density. Accordingly, a metal-made three-dimensional shaped article that is large and has a particularly high density can be produced.

Hereinafter, embodiments according to the present disclosure will be described with reference to the accompanying drawings.

First, an outline of a three-dimensional shaped article production apparatus 1 capable of carrying out the three-dimensional shaped article production method of the present disclosure will be described with reference to FIG. 1.

Here, in the drawings, the X direction is a horizontal direction, and the Y direction is a horizontal direction and also a direction orthogonal to the X direction. Further, the Z direction is a vertical direction and corresponds to the stacking direction of layers L.

The three-dimensional shaped article production apparatus 1 of this embodiment is a three-dimensional shaped article production apparatus for producing a three-dimensional shaped article by stacking layers L. Then, as shown in FIG. 1, the three-dimensional shaped article production apparatus 1 of this embodiment includes a table unit 10 having a shaping table 9, a supply unit 8 supplying a constituent material of the three-dimensional shaped article to the shaping table 9, and a controller 12 controlling the operation of the table unit 10 and the supply unit 8. The three-dimensional shaped article production apparatus 1 is electrically coupled to an external device 20 such as a PC, and is configured to be able to receive an instruction from a user through the external device 20.

The shaping table 9 is configured to be movable in the Z direction by the control of the controller 12. A shaping face 9a of the shaping table 9 is disposed at a position lower than an upper face portion 10a of the table unit 10 by a predetermined distance in the Z direction, and the layer L for one layer is formed by supplying the constituent material of the three-dimensional shaped article from the supply unit 8 to the shaping face 9a. Then, the layers are stacked by repeating downward movement of the shaping table 9 by a predetermined distance and supply of the constituent material of the three-dimensional shaped article from the supply unit 8. FIG. 1 shows a state where two stacked bodies S that are the three-dimensional shaped articles are formed on the shaping face 9a by repeating layer formation for four layers: a layer L1, a layer L2, a layer L3, and a layer L4.

The supply unit 8 is configured to be movable in the X direction along a guide bar 11. Further, the supply unit 8 includes a first metal powder supply portion 2 supplying a first metal powder having a first average particle diameter as the constituent material of the three-dimensional shaped article to the shaping table 9. In this embodiment, as the first metal powder supply portion 2, a first metal powder supply portion 2a and a first metal powder supply portion 2b are disposed at end portions of the supply unit 8 in the X direction. Note that as the "average particle diameter", for example, d50 that is a median diameter can be adopted.

Further, the supply unit 8 includes a compression roller 6 capable of compressing and leveling the first metal powder supplied to the shaping table 9. In this embodiment, as the compression roller 6, a compression roller 6a provided in the vicinity of the first metal powder supply portion 2a and a compression roller 6b provided in the vicinity of the first metal powder supply portion 2b are included.

Further, the supply unit 8 includes a first liquid supply portion 3 supplying a first liquid I1 containing a second metal powder having a second average particle diameter and a binder to at least a portion of a constituent region R of the three-dimensional shaped article in the layer L. Here, a ratio of the second average particle diameter to the first average particle diameter is 1/10 or more and 1/2 or less.

Further, the supply unit 8 includes a second liquid supply portion 4 supplying a second liquid I2 containing at least either the second metal powder at a lower concentration than the first liquid I1 or a third metal powder having a larger average particle diameter than the second average particle diameter and containing a binder to at least a portion of a surface layer region Re in the constituent region R. The configuration of the second liquid supply portion 4 may be the same as or different from that of the first liquid supply portion 3. In both cases where the first liquid I1 is applied to the constituent region R and where the second liquid I2 is applied to the constituent region R, the constituent region R can be densified. However, for example, voids capable of allowing a gas such as a vaporized binder to pass therethrough increase or become larger when only the second liquid I2 or the first liquid I1 and the second liquid I2 are applied to the constituent region R than when only the first liquid I1 is applied to the constituent region R. However, the constituent region R can be further densified when only the first liquid I1 is applied to the constituent region R than when only the second liquid I2 or the first liquid I1 and the second liquid I2 are applied to the constituent region R.

Further, the supply unit 8 includes a third liquid supply portion 5 supplying a third liquid I3 containing a ceramic powder having a higher melting point than the melting point of any of the first metal powder, the second metal powder, and the third metal powder. A region C to which the third liquid I3 is supplied inhibits sintering of the metal powder in the sintering step, and enables easy separation after sintering. For example, as shown in FIG. 1, when the third liquid I3 is supplied to the region C, and the stacked body S is sintered at a temperature that is equal to or higher than the sintering temperature of the first metal powder and the second metal powder and lower than the sintering temperature of the ceramic powder, a hole can be formed in a portion Sc that is a portion of the constituent region R and is surrounded by the region C.

Further, the supply unit 8 includes a heater 7 for drying a solvent or the like of the first liquid I1, the second liquid I2, and the third liquid I3. As the heater 7, for example, an infrared radiation heater or the like can be used, but there are no particular limitations.

A discharge port for the first metal powder in the first metal powder supply portion 2, the compression roller 6, an injection port for a liquid in the first liquid supply portion 3, an injection port for a liquid in the second liquid supply portion 4, an injection port for a liquid in the third liquid supply portion 5, and the heater 7 are all provided extending in the Y direction. In addition, the first liquid supply portion 3, the second liquid supply portion 4, and the third liquid supply portion 5, and also the heater 7 are configured such that the relative positions can be individually changed. For example, by changing the position in the Z direction, the distance to the shaping face 9*a* of the shaping table 9 can be changed.

As shown in FIG. 1, in the supply unit 8 of this embodiment, the arrangement of the first metal powder supply portion 2, the first liquid supply portion 3, the second liquid supply portion 4, the third liquid supply portion 5, the compression roller 6, and the heater 7 is not symmetric in the X direction when viewed from the Y direction. However, it is preferred that the arrangement of these members is symmetric in the X direction. This is because by making the arrangement of these members symmetric in the X direction, the layer L can be formed under the same conditions both when moving in the X1 direction in the X direction and when moving in the X2 direction in the X direction.

Next, the constituent material that can be used in the three-dimensional shaped article production apparatus 1 of this embodiment will be described in detail.

As the first metal powder, the second metal powder, and the third metal powder, for example, a simple substance powder of magnesium (Mg), iron (Fe), cobalt (Co), chromium (Cr), aluminum (Al), titanium (Ti), copper, (Cu), or nickel (Ni), or a mixed powder of an alloy containing one or more of these metals (a maraging steel, stainless steel (SUS), cobalt-chrome-molybdenum, a titanium alloy, a nickel alloy, an aluminum alloy, a cobalt alloy, or a cobalt-chromium alloy) or the like can be used.

As the ceramic powder, for example, silicon dioxide, titanium dioxide, aluminum oxide, zirconium oxide, or the like can be preferably used.

As the binder, for example, polyvinyl alcohol, carboxymethyl cellulose, polypropylene, polyethylene, polyoxymethylene, polymethyl methacrylate, paraffin wax, or the like can be preferably used. Further, for example, an acrylic resin, an epoxy resin, a silicone resin, a cellulosic resin, or another synthetic resin, or PLA (polylactic acid), PA (polyamide), PPS (polyphenylene sulfide), or another thermoplastic resin or the like can be used alone or in combination.

Further, the first liquid I1, the second liquid I2, and the third liquid I3 may further contain a solvent, and as a preferred solvent, for example, water; (poly)alkylene glycol monoalkyl ethers such as ethylene glycol monomethyl ether, ethylene glycol monoethyl ether, propylene glycol monomethyl ether, and propylene glycol monoethyl ether; acetate esters such as ethyl acetate, n-propyl acetate, iso-propyl acetate, n-butyl acetate, and iso-butyl acetate; aromatic hydrocarbons such as benzene, toluene, and xylene; ketones such as methyl ethyl ketone, acetone, methyl isobutyl ketone, ethyl n-butyl ketone, diisopropyl ketone, and acetyl acetone; alcohols such as ethanol, propanol, and butanol; tetra-alkyl ammonium acetates; sulfoxide-based solvents such as dimethyl sulfoxide and diethyl sulfoxide; pyridine-based solvents such as pyridine, γ-picoline, and 2,6-lutidine; ionic liquids such as tetra-alkyl ammonium acetate (for example, tetra-butyl ammonium acetate, etc.), and the like are exemplified, and one type or two or more types in combination selected from these can be used.

Next, one Example of a three-dimensional shaped article production method to be performed using the above-mentioned three-dimensional shaped article production apparatus 1 will be described using the flowchart in FIG. 2.

Figure 2:
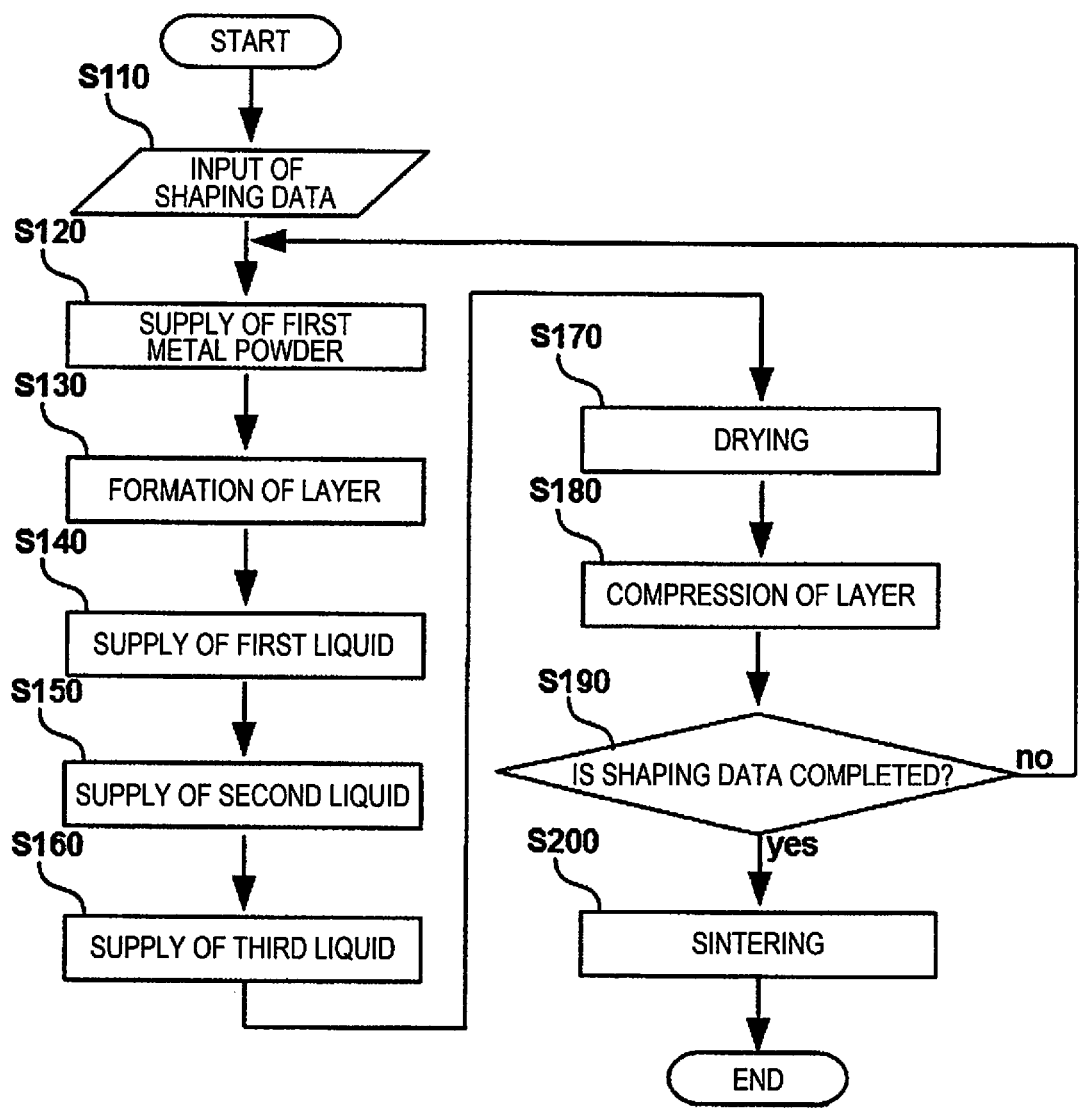
FIG. 2 is a flowchart of the three-dimensional shaped article production method according to one Example of the present disclosure.

In the three-dimensional shaped article production method of this Example, first, as shown in the flowchart in FIG. 2, in a shaping data input step of Step S110, the shaping data of a three-dimensional shaped article to be produced is input. An input source of the shaping data of the three-dimensional shaped article is not particularly limited, however, the shaping data can be input to the three-dimensional shaped article production apparatus 1 using a PC or the like as the external device 20.

Subsequently, in a first metal powder supply step of Step S120, the first metal powder is supplied to the shaping face 9*a* of the shaping table 9 from the first metal powder supply portion 2 shown in FIG. 1.

Subsequently, in a layer formation step of Step S130, the first metal powder supplied to the shaping table 9 is compressed by the compression roller 6, thereby forming the layer L.

Subsequently, in a first liquid supply step of Step S140, the first liquid I1 containing a binder and the second metal powder having a second average particle diameter that is an average particle diameter 1/10 or more and 1/2 or less the first average particle diameter to a portion of the constituent region R of the three-dimensional shaped article in the layer L from the first liquid supply portion 3. More specifically, the first liquid I1 is supplied to the entire internal region Ri in the constituent region R of the three-dimensional shaped article or a portion of the internal region Ri, and moreover to a portion of the surface layer region Re in the constituent region R depending on the situation.

Subsequently, in a second liquid supply step of Step S150, the second liquid I2 containing either the second metal powder at a lower concentration than the first liquid I1 and the third metal powder having a larger average particle diameter than the second average particle diameter and containing a binder is supplied to at least a portion of the surface layer region Re in the constituent region R from the second liquid supply portion 4.

Figure 3:
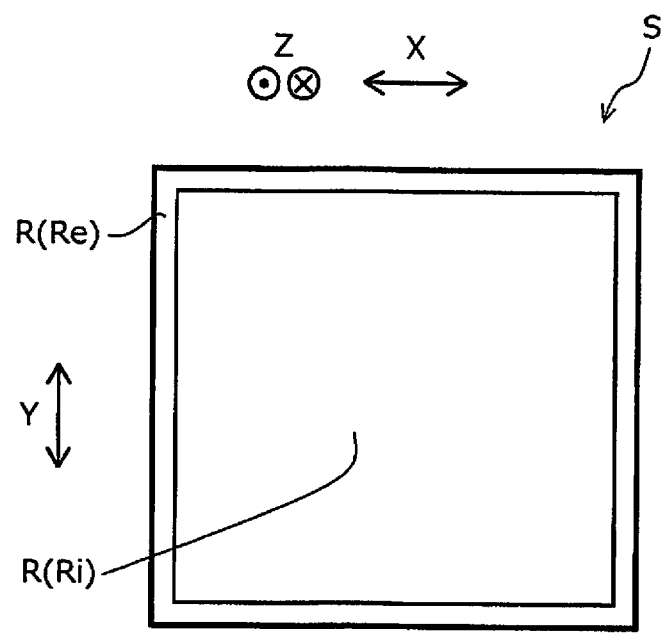
FIG. 3 is a cross-sectional view of one example of a three-dimensional shaped article formed by the three-dimensional shaped article production method according to one Example of the present disclosure.

Here, FIG. 3 is a schematic view showing one example of the stacked body S in which the first liquid I1 is supplied to the entire internal region Ri and the second liquid I2 is supplied to the entire surface layer region Re.

First, one specific example of a case where the second liquid I2 containing the second metal powder at a lower concentration than the first liquid I1 is supplied to the surface layer region Re from the second liquid supply portion 4 will be described. Polyvinyl alcohol is used as the binder of both the first liquid I1 and the second liquid I2, and the first liquid I1 is configured to contain 5 vol % of the second metal powder having an average particle diameter of 5 μm, and the second liquid I2 is configured to contain 2.5 vol % of the second metal powder having an average particle diameter of 5 μm. In such a case, for example, the mass ratio of the second metal powder to the first metal powder in the internal region Ri is set to 8:1, and the mass ratio of the second metal powder to the first metal powder in the surface layer region Re is set to 8:3. According to this, the metal density of the surface layer region Re is increased so as to be able to make the surface layer region Re have high rigidity, and also by decreasing the amount of the binder in the internal region Ri, incomplete escape of the binder from the internal region Ri due to too much amount of the binder vaporized by sintering can be suppressed.

Next, one specific example of a case where the second liquid I2 containing the third metal powder having a larger average particle diameter than the second average particle diameter is supplied to the surface layer region Re from the second liquid supply portion 4 will be described. Polyvinyl alcohol is used as the binder of both the first liquid I1 and the second liquid I2, and the first liquid I1 is configured to contain 5 vol % of the second metal powder having an average particle diameter of 5 μm, and the second liquid I2 is configured to contain 5 vol % of the third metal powder having an average particle diameter of 15 μm. In such a case, for example, the mass ratio of the second metal powder to the first metal powder in the internal region Ri is set to 8:1, and the mass ratio of the third metal powder to the first metal powder in the surface layer region Re is set to 8:3. According to this, the metal density of the surface layer region Re is increased so as to be able to make the surface layer region Re have high rigidity, and also by preventing the voids from becoming too small while decreasing the number of voids in the surface layer region Re, the binder is made easy to escape, so that the binder can be prevented from remaining in the internal region Ri accompanying sintering.

Subsequently, in a third liquid supply step of Step S160, the third liquid I3 containing a ceramic powder having a higher melting point than the melting point of any of the first metal powder, the second metal powder, and the third metal powder is supplied to the region C from the third liquid supply portion 5. By carrying out this Step S160 so as to dispose the ceramic powder in the region C, a hole can be formed in the portion Sc that is a portion of the constituent region R and is surrounded by the region C as described above. However, this step can be omitted depending on the shape of the three-dimensional shaped article to be produced, or the like.

Subsequently, in a drying step of Step S170, the first liquid I1, the second liquid I2, and the third liquid I3 are dried using the heater 7. However, this step can be omitted depending on the shape of the three-dimensional shaped article to be produced, the compositions of the first liquid I1, the second liquid I2, and the third liquid I3 to be used, or the like.

Subsequently, in a layer compression step of Step S180, the layer L is compressed by the compression roller 6. As shown in FIG. 1, the three-dimensional shaped article production apparatus 1 of this embodiment includes, as the compression roller 6, the compression roller 6a provided in the vicinity of the first metal powder supply portion 2a and the compression roller 6b provided in the vicinity of the first metal powder supply portion 2b. That is, for example, when the first metal powder is supplied to the shaping face 9a of the shaping table 9 from the first metal powder supply portion 2a while moving in the X1 direction in Step S120, the compression of the layer L by the compression roller 6a corresponds to the layer formation step of Step S130, and the compression of the layer L by the compression roller 6b corresponds to the layer compression step of this Step S180. In this manner, for example, by the movement of the supply unit 8 in the X1 direction one time, the first metal powder supply step of Step S120, the layer formation step of Step S130, the first liquid supply step of Step S140, the second liquid supply step of Step S150, the third liquid supply step of Step S160, the drying step of Step S170, and the layer compression step of Step S180 are carried out.

Then, in a determination step of Step S190, it is determined whether or not the layer formation based on the shaping data input in Step S110 is all completed by the controller 12. When it is determined that the layer formation is not all completed, the process returns to Step S120, and the subsequent layer L is formed. On the other hand, when it is determined that the layer formation is all completed, the process proceeds to Step S200.

In a sintering step of Step S200, the stacked body S of the layers L produced by repeating the process from Step S120 to Step S190 is heated so as to sinter the metal in the constituent region R. The sintering step of this Step S200 may be performed by the three-dimensional shaped article production apparatus 1 or may be performed using another apparatus different from the three-dimensional shaped article production apparatus 1. The three-dimensional shaped article production method of this Example is terminated with the termination of this Step S200.

Here, once summarized, as described above, the three-dimensional shaped article production method of this Example is a three-dimensional shaped article production method for producing a three-dimensional shaped article by stacking the layers L. Then, the first metal powder supply step of supplying the first metal powder having a first average particle diameter to the shaping table 9 corresponding to Step S120 is included. Further, the layer formation step of forming the layer L by compressing the first metal powder supplied to the shaping table 9 corresponding to Step S130 is included. Further, the first liquid supply step of supplying the first liquid I1 containing a binder and the second metal powder having a second average particle diameter that is an average particle diameter ¹/₁₀ or more and ½ or less the first average particle diameter to a portion of the constituent region R of the three-dimensional shaped article in the layer L corresponding to Step S140 is included. Further, the second liquid supply step of supplying the second liquid I2 containing at least either the second metal powder at a lower concentration than the first liquid I1 or the third metal powder having a larger average particle diameter than the second average particle diameter and containing a binder to at least a portion of the surface layer region Re in the constituent region R corresponding to Step S150 is included. Further, the sintering step of sintering the metal in the constituent region R by heating the stacked body S of the layers L corresponding to Step S200 is included.

As described above, in the three-dimensional shaped article production method of this Example, the first liquid I1 containing a binder and the second metal powder having the second average particle diameter smaller than the first average particle diameter is supplied. That is, by the first liquid I1 that is a liquid easy to penetrate into voids among particles, the second metal powder that is small particles can be effectively disposed in the voids in the first metal powder that is large particles. Therefore, the three-dimensional shaped article can be made highly dense. Further, in the three-dimensional shaped article production method of this Example, by disposing the second liquid I2 containing at least either the second metal powder at a lower concentration than the first liquid I1 or the third metal powder having a larger average particle diameter than the second average particle diameter in at least a portion of the surface layer region Re, voids through which the binder or the like escapes can be formed in at least a portion of the surface layer region Re, so that the binder or the like can be effectively removed (degreased) from the surface layer region Re. Accordingly, the three-dimensional shaped article production method of this Example can produce a metal-made three-dimensional shaped article that is large and has a high density.

Here, in the three-dimensional shaped article production method of this Example, in the second liquid supply step of Step S150, the second liquid I2 can be supplied to the entire surface layer region Re. By supplying the second liquid I2 to the entire surface layer region Re, while making the three-dimensional shaped article highly dense, voids through which the binder or the like can escape from the entire surface layer of the three-dimensional shaped article can be formed, and thus, the binder or the like can be effectively removed (degreased) from the surface layer region Re.

Further, in the three-dimensional shaped article production method of this Example, by supplying the first liquid I1 to the internal region Ri in the first liquid supply step of Step S140, and also by supplying the second liquid I2 to the internal region Ri in the second liquid supply step of Step S150, the first liquid I1 and the second liquid I2 can be supplied to the internal region Ri. By supplying the first liquid I1 and the second liquid I2 to the internal region Ri, for example, when a large three-dimensional shaped article is produced, or the like, even if the binder or the like may not be able to escape to the surface layer region Re when only the first liquid I1 is supplied to the internal region Ri, the binder or the like can be effectively removed (degreased) to the surface layer region Re in the internal region Ri. Accordingly, a metal-made three-dimensional shaped article that is large and has a high density can be favorably produced.

Further, in the three-dimensional shaped article production method of this Example, the first liquid I1 and the second liquid I2 can be alternately supplied to the internal region Ri at every layer L to be stacked. Specifically, when the process from Step S120 to Step S190 is repeated, for example, the process can be controlled so that the first liquid I1 is supplied to the internal region Ri at odd number of times, and the second liquid I2 is supplied to the internal region Ri at even number of times. By alternately supplying the first liquid I1 and the second liquid I2 to the internal region Ri at every layer L in this manner, the binder or the like can be effectively removed (degreased) to the surface layer region Re in the internal region Ri. Accordingly, a metal-made three-dimensional shaped article that is particularly large and has a high density can be favorably produced.

Further, in the three-dimensional shaped article production method of this Example, it is also possible to supply the first liquid I1 to the internal region Ri without supplying the second liquid I2. By supplying only the first liquid I1 to the internal region Ri without supplying the second liquid I2, the internal region Ri can be configured to have a particularly high density. Accordingly, a metal-made three-dimensional shaped article that is large and has a particularly high density can be produced.

The present disclosure is not limited to the above-mentioned Examples, but can be realized in various configurations without departing from the gist of the present disclosure. The technical features in the Examples corresponding to the technical features in the respective aspects described in "SUMMARY" of the present disclosure may be appropriately replaced or combined in order to solve part or all of the problems described above or achieve part or all of the advantageous effects described above. Further, the technical features may be appropriately deleted unless they are described as essential features in the specification.

What is claimed is:

1. A three-dimensional shaped article production method for producing a three-dimensional shaped article by stacking layers, comprising:
    a first metal powder supply step of supplying a first metal powder having a first average particle diameter to a shaping table;
    a layer formation step of forming a first layer by compressing the first metal powder supplied to the shaping table;
    a first liquid supply step of supplying a first liquid containing a binder and a second metal powder having a second average particle diameter that is an average particle diameter $\frac{1}{10}$ or more and $\frac{1}{2}$ or less the first average particle diameter to a portion of a constituent region of the first layer where the three-dimensional shaped article is formed, the constituent region containing a surface layer region that defines an outline of the three-dimensional shaped article and an internal region other than the surface layer region;
    a second liquid supply step of supplying at least either a second liquid or a third liquid to at least a portion of the surface layer region of the first layer so that a metal density in at least the portion of the surface layer region of the first layer is higher than a metal density in the internal region of the first layer, the second liquid containing the binder and the second metal powder, in which a concentration of the second metal powder in the second liquid is lower than a concentration of the second metal powder in the first liquid, the third liquid containing the binder and a third metal powder having a larger average particle diameter than the second average particle diameter; and
    a sintering step of sintering a metal in the constituent region by heating a stacked body of the layers including the first layer.

2. The three-dimensional shaped article production method according to claim 1, wherein in the second liquid supply step, the second liquid is supplied to the entire surface layer region.

3. The three-dimensional shaped article production method according to claim 1, wherein the first liquid and the second liquid are supplied to the internal region.

4. The three-dimensional shaped article production method according to claim 3, wherein the first liquid and the second liquid are alternately supplied to the internal region at every layer.

5. The three-dimensional shaped article production method according to claim 1, wherein the first liquid is supplied to the internal region other than the surface layer region in the constituent region without supplying the second liquid.

* * * * *